US009916163B2

(12) United States Patent
Kim

(10) Patent No.: US 9,916,163 B2
(45) Date of Patent: *Mar. 13, 2018

(54) METHOD OF SYNCHRONIZING INDEPENDENT FUNCTIONAL UNIT

(71) Applicant: International Business Machines Corporation, Armonk, NY (US)

(72) Inventor: Changhoan Kim, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,204

(22) Filed: Jan. 9, 2017

(65) Prior Publication Data

US 2017/0147352 A1 May 25, 2017

Related U.S. Application Data

(63) Continuation of application No. 15/237,026, filed on Aug. 15, 2016, now Pat. No. 9,569,215, which is a continuation of application No. 14/950,452, filed on Nov. 24, 2015, now Pat. No. 9,652,235.

(51) Int. Cl.
*G06F 9/30* (2006.01)
*G06F 9/38* (2006.01)

(52) U.S. Cl.
CPC .......... *G06F 9/3851* (2013.01); *G06F 9/3005* (2013.01); *G06F 9/3009* (2013.01); *G06F 9/3885* (2013.01)

(58) Field of Classification Search
CPC ........ G06F 8/458; G06F 9/3005; G06F 9/321; G06F 9/3851; G06F 9/3885; G06F 9/30087; G06F 9/3009
See application file for complete search history.

(56) References Cited

U.S. PATENT DOCUMENTS

| 6,212,621 | B1 | 4/2001 | Mahalingalah |
| 6,317,820 | B1 | 11/2001 | Shiell |
| 6,792,525 | B2 | 9/2004 | Mukherjee et al. |
| 7,493,615 | B2 | 2/2009 | Gewirtz et al. |

(Continued)

OTHER PUBLICATIONS

List of IBM Patents or Patent Applications Treated as Related dated Jan. 17, 2017, pp. 1-2.

(Continued)

*Primary Examiner* — Benjamin Geib
(74) *Attorney, Agent, or Firm* — Scully, Scott, Murphy & Presser, PC; Daniel P. Morris, Esq.

(57) ABSTRACT

A system for synchronizing parallel processing of a plurality of functional processing units (FPU), a first FPU and a first program counter to control timing of a first stream of program instructions issued to the first FPU by advancement of the first program counter; a second FPU and a second program counter to control timing of a second stream of program instructions issued to the second FPU by advancement of the second program counter, the first FPU is in communication with a second FPU to synchronize the issuance of a first stream of program instructions to the second stream of program instructions and the second FPU is in communication with the first FPU to synchronize the issuance of the second stream program instructions to the first stream of program instructions.

15 Claims, 7 Drawing Sheets

(56) References Cited

U.S. PATENT DOCUMENTS

| | | | |
|---|---|---|---|
| 8,631,205 | B1 | 1/2014 | Wentzlaff et al. |
| 8,633,936 | B2 | 1/2014 | Du et al. |
| 8,656,143 | B2 | 2/2014 | Cooke |
| 8,817,029 | B2 | 8/2014 | Brothers et al. |
| 2006/0026388 | A1* | 2/2006 | Karp .................... G06F 9/3836 712/24 |
| 2008/0320485 | A1 | 12/2008 | Joffe et al. |
| 2013/0007415 | A1 | 1/2013 | Babayan et al. |

OTHER PUBLICATIONS

Wallace et al., "Instruction recycling on a multiple-path processor." High-Performance Computer Architecture, Proceedings, Fifth International Symposium On, IEEE, 1999, pp. 1-10.

Gupta et al. "The stagenet fabric for constructing resilient multicore systems." Proceedings of the 41st annual IEEE/ACM International Symposium on Microarchitecture. IEEE Computer Society, 2008, pp. 1-11.

Tilt, "Compiling for a Multithreaded Horizontally-Microcoded Soft Processor Family", Diss. University of Toronto, 2013, pp. 1-90.

Tomasulo, R.M., "An Efficient Algorithm for Exploiting Multiple Arithmetic Units", IBM Journal, Jan. 1967, pp. 25-33.

Hennessy, J.M. et al., "Computer Architecture, A Quantitative Approach", Fifth Edition, Elsevier Inc., 2012, pp. 1-1357.

Smith, J. E., "Decoupled Access/Execute Computer Architectures", IEEE, 1982, pp. 112-119.

List of IBM Patents or Patent Applications Treated as Related dated Jan. 9, 2017, pp. 1-2.

U.S. Office Action dated Mar. 11, 2016 in parent U.S. Appl. No. 14/950,452.

Notice of Allowance dated Jun. 22, 2016 in parent U.S. Appl. No. 14/950,452.

Notice of Allowance dated Sep. 23, 2016 from parent U.S. Appl. No. 15/237,026.

* cited by examiner

METHOD OF SYNCHRONIZING INDEPENDENT FUNCTIONAL UNIT

This invention was made with Government support under Contract No.: B599858 awarded by Department of Energy. The Government has certain rights in this invention.

BACKGROUND OF THE INVENTION

This disclosure relates to parallel processing and particularly to synchronization of multiple functional units.

In many parallel processing systems, there are multiple functional units working independently but sharing a register file. In such a system, a fast synchronization method is needed. One known method of parallel usage of multiple functional units is decoupled access/execute architecture (DAE arch), which includes two independent units communicating using two queues and synchronization is achieved by the same queuing mechanism another known method is modern out-of-order architecture (Modern arch), in which several functional units are working in parallel but based on single program counter. In this method, dependency is enforced by complex register renaming and an interlocking pipeline is used. A third known method is VLIW architecture, in which all functional units proceed in lock-step.

SUMMARY OF INVENTION

This disclosure is directed to system for synchronizing parallel processing of a plurality of functional processing units. In one embodiment, the system includes a first functional processing unit, a first program counter and a first program instruction buffer used by the first functional processing unit. The system includes a second functional processing unit, a second program counter and a second program instruction buffer used by the second functional processing unit. The first functional processing unit being in communication with the second functional processing unit and configured to synchronize the issuance of the first stream of program instructions to the second stream of program instructions and the second functional processing unit being in communication with the first functional processing unit and configured to synchronize the issuance of the second stream program instructions to the first stream of program instructions.

In one embodiment each functional processing unit places a limit on the program counter of other functional unit. At least one of the first and second program instruction buffers include 'set limit' instructions inserted in the respective first and second program instruction streams.

In one embodiment, the first and second program instruction buffers include at least one pair of wait-go instructions in which one instruction of the wait-go pair is inserted in the first program instruction stream and the other instruction of the wait-go pair is inserted in the second program instruction stream. In one example, the first program instruction stream includes at least one 'wait' instruction and a matching 'go' instruction is included in the second instruction stream.

In one embodiment the first and second program instruction buffers include at least one pair of instructions inserted with wait-go bits in which one instruction of the pair has one of the wait-go bits inserted in the first program instruction stream and the other instruction of the pair has the other of the wait-go bits is inserted in the second program instruction stream. In one example, each instruction comes with attributes, such as additional bit fields, that indicate 'wait' or 'go'. Instructions in the first program instruction stream may have 'wait' attributes and instructions in the second program instruction stream have matching 'go' attributes.

In one embodiment the disclosure is directed to a method for synchronizing parallel processing in a system having a first functional processing unit, a first program counter and a first program instruction buffer used by the first functional processing unit, and a second functional processing unit, a second program counter and a second program instruction buffer used by the second functional processing unit. The method includes synchronizing at least one of the issuance of the first stream of program instructions to the second stream of program instructions through communication from the first functional processing unit communication to the second functional processing unit and the issuance of the second stream program instructions to the first stream of program instructions through communication from the second functional processing unit to the first functional processing unit.

In one embodiment the disclosure is directed to a non-transitory article of manufacture tangibly embodying computer readable instructions, which when implemented, cause a computer to perform the steps of a method for synchronizing parallel processing system having a first functional processing unit, a first program counter and a first program instruction buffer used by the first functional processing unit, and a second functional processing unit, a second program counter and a second program instruction buffer used by the second functional processing unit. A first synchronization setting unit is in communication with the first and second functional processing units and a second synchronization setting unit is in communication with the first and second functional processing units. The method includes synchronizing at least one of the issuance of the first stream of program instructions to the second stream of program instructions through communication from the first functional processing unit communication to the second functional processing unit to and the issuance of the second stream program instructions to the first stream of program instructions through communication from the second functional processing unit to the first functional processing unit.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF PREFERRED EMBODIMENTS

Figure 1A:
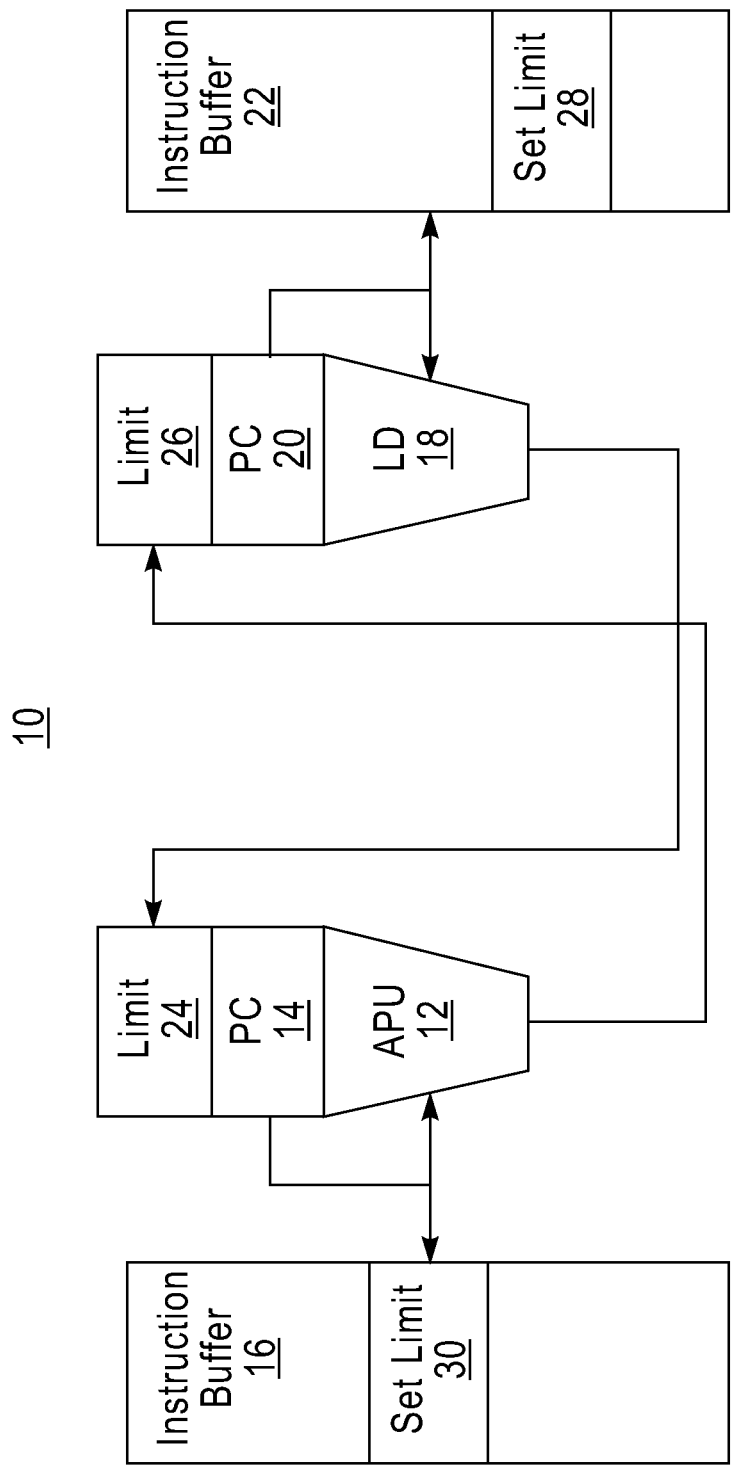
FIG. 1A is a block diagram of one embodiment of a counter limit implementation.

As shown in FIG. 1, one embodiment of this disclosure includes a system for synchronizing parallel processing of a plurality of functional processing units. The system 10 includes a first functional processing unit APU 12 having a first program counter 14. The first program counter unit 14 is configured to control timing of program instructions issued to the first functional processing unit APU 12 by advancement of the first program counter 14. A first program instruction buffer 16 is used by the first functional processing unit 12. The first program counter 14 is configured to point current instruction in the first program instruction buffer 16 which is read and issued by the first functional processing unit APU 12.

A second functional processing unit LD 18 has a second program counter 20. The second program counter 20 is configured to control timing of program instructions issued to the second functional processing unit LD 18 by advancement of the second program counter 20. A second program instruction buffer 22 is used by the second functional processing unit 18. The second program counter 20 is configured to point to a current instruction in the second program instruction buffer 22 which is read and issued by the second functional processing unit LD 18.

The first functional processing unit APU 12 is in communication with the second functional processing unit LD 18 to control the issuance of program instructions of the second functional processing unit LD 18. The second functional processing unit LD 18 is in communication with the first functional processing unit APU 12 to control the issuance of program instructions of the first functional processing unit APU 12.

Figure 1B:
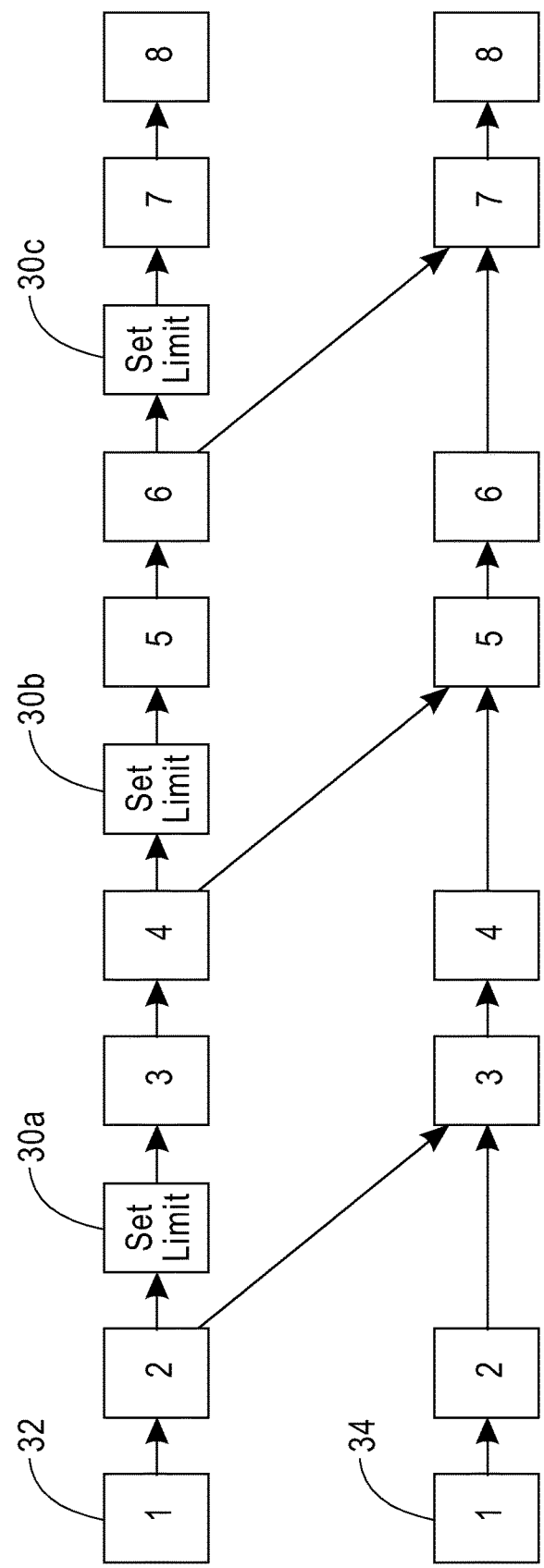
FIG. 1B is a schematic diagram of the instructions streams of two functional units of the embodiment of FIG. 1A.

In the embodiment of FIG. 1A, synchronization between the program instructions of the functional processing units is provided by placing a limit on program counter advancement. In this embodiment, 'set limit' instructions 30 are inserted in instruction buffer 16 to set a limit 26 on the advancement of program counter 20 of LD unit 18. Likewise, set limit instructions 28 are inserted in instruction buffer 22 to set a limit 24 on the advancement of program counter 14 of APU 12. The limit instruction 30 in the program instruction buffer 16 limits the advancement of the program counter 20 to synchronize with advancement with the program counter 14. The limit instruction 28 in the program instruction buffer 22 limits the advancement of the program counter 14 to synchronize with advancement with the program counter 20.

The program counters 14 and 20 constantly check the instruction stream for when the limit is reached and when the program counter determines that the instruction limit has been reached, the corresponding functional processing unit temporarily stops receiving instructions until the limit is changed. As shown in one exemplary embodiment in FIG. 1B, instruction stream 32 is for APU 12 and instruction stream 34 is for LD 18. In this example, instructions 3, 5, 7 of stream 34 depend on instructions 2, 4, 6 of stream 32. Set limit instructions 30a, 30b and 30c are inserted into instruction stream 32. Initially, APU 12 sets the limit 26 for LD 18 to 2. Set limit instruction 30a causes APU 12 to set the limit of LD unit 18 to 4 after executing instruction 2 of stream 32. If LD 18 stream 34 reaches 2 before the APU 12 stream 32 passes 2, LD 18 stream 34 waits at instruction 2 until the APU 12 changes the limit of LD 18 to 4. Similarly, set limit instruction 30b causes APU 12 to set the limit of LD unit 18 to 6 after executing instruction 4 of stream 32. If LD 18 stream 34 reaches 4 before the APU 12 stream 32 passes 4, LD 18 stream 34 waits at instruction 4 until the APU 12 changes the limit of LD 18 to 4.

Figure 2A:
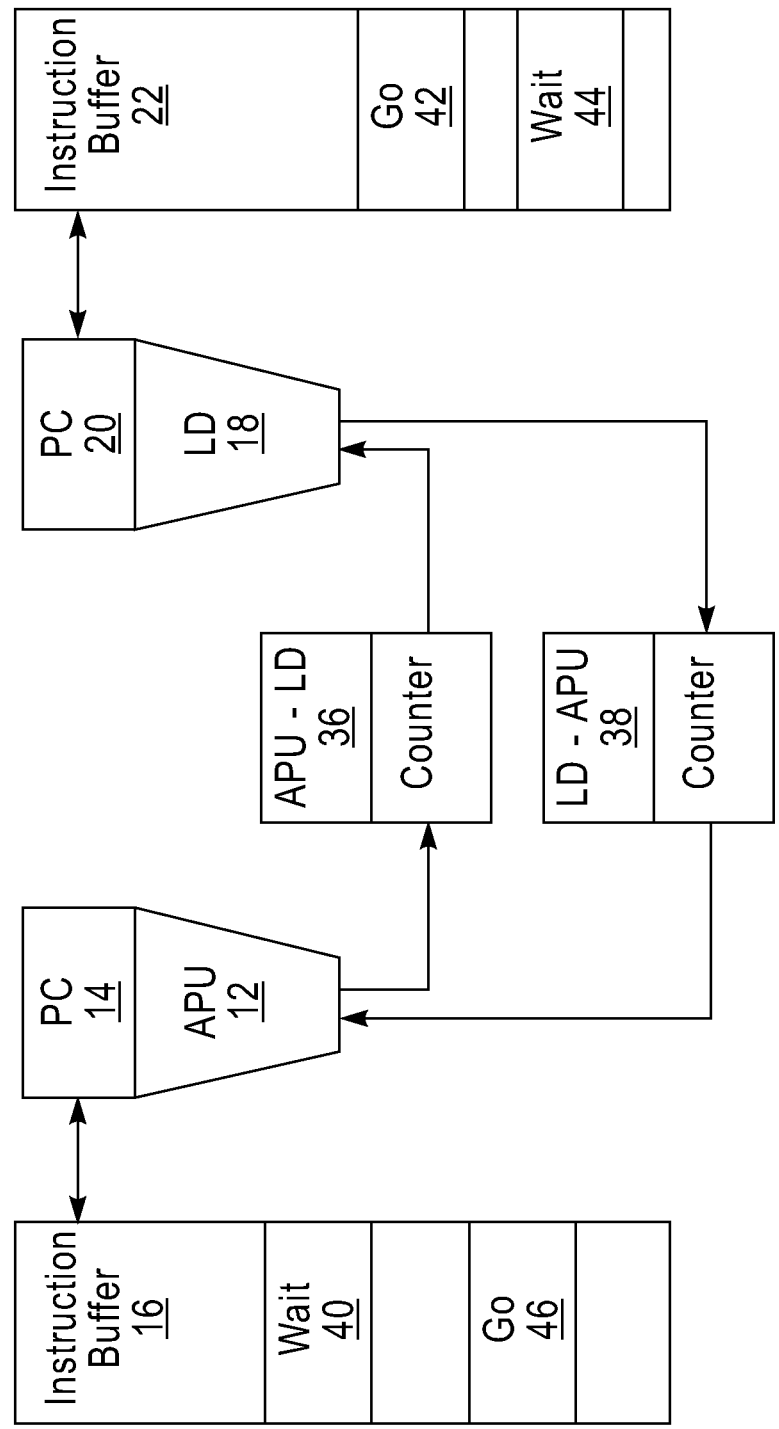
FIG. 2A is a block diagram of one embodiment of a wait-go instruction pair implementation.
Figure 2B:
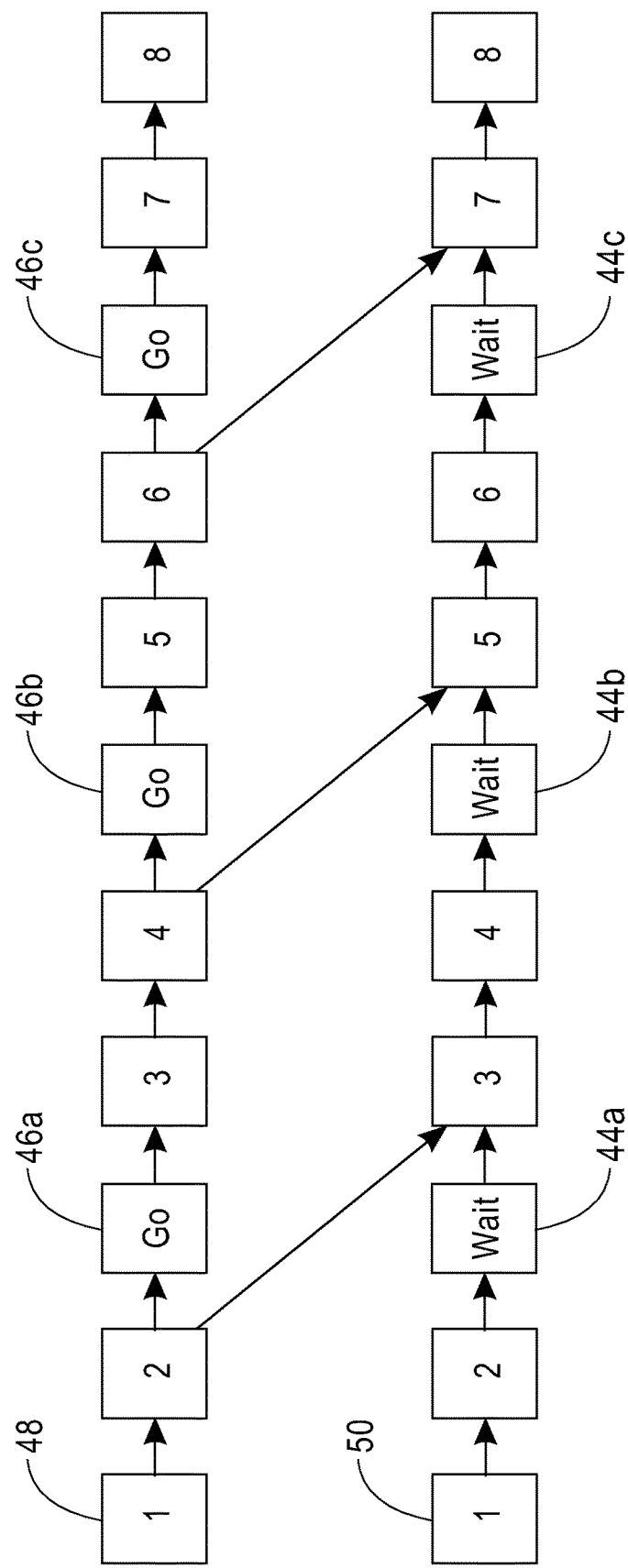
FIG. 2B is a schematic diagram of the instructions streams of two functional units in the embodiment of FIG. 2A.
Figure 3A:
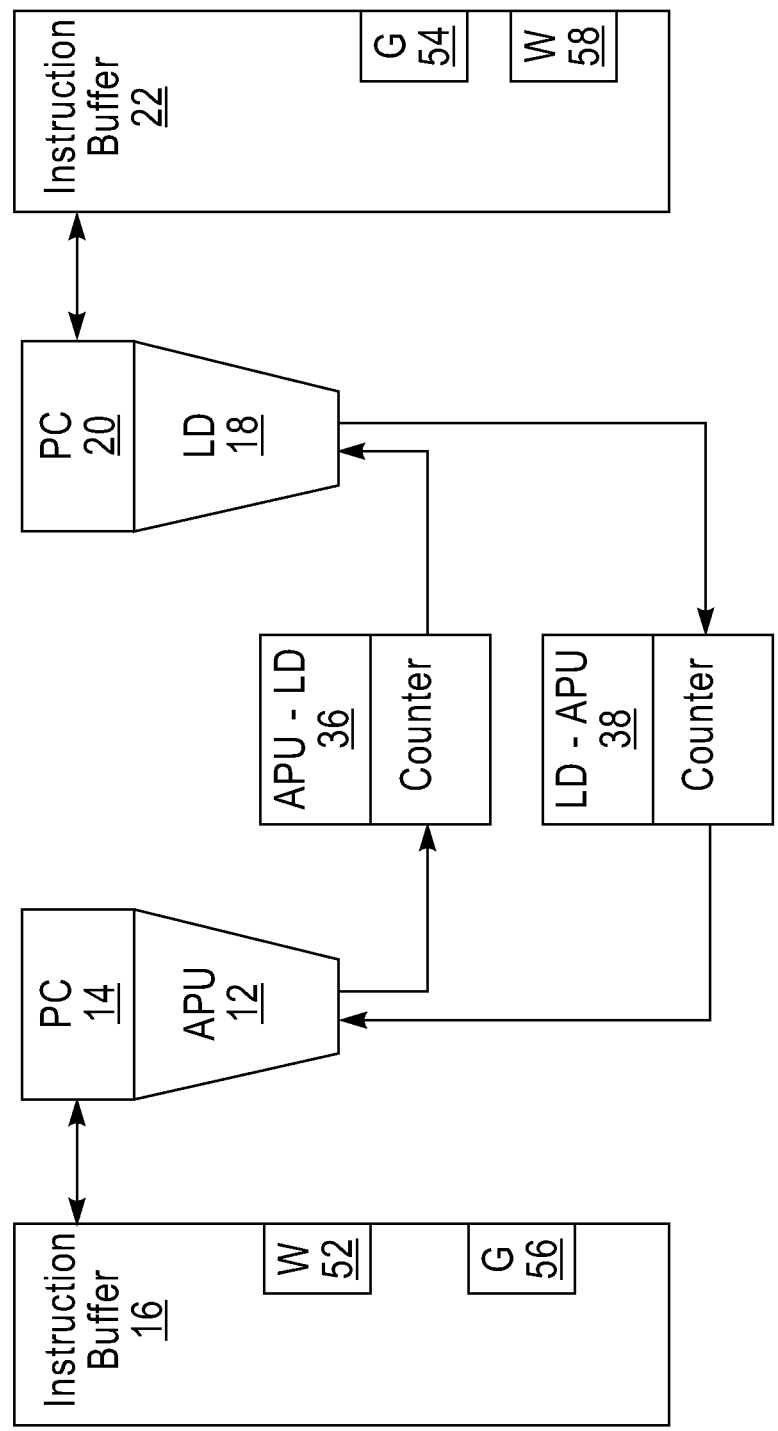
FIG. 3A is a block diagram of one embodiment of a wait-go bit pair implementation.
Figure 3B:
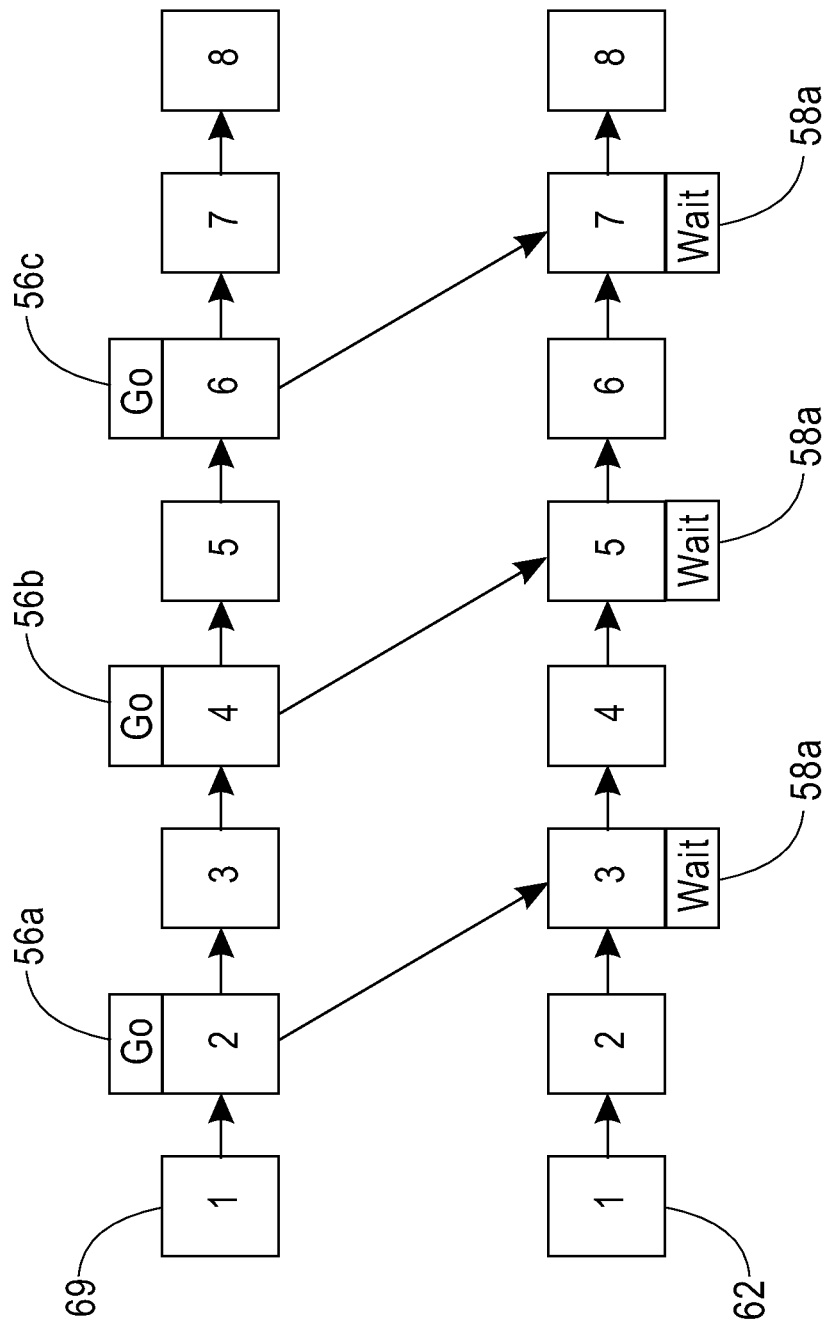
FIG. 3B is a schematic diagram of the instructions streams of two functional units in the embodiment of FIG. 3A.

In one embodiment synchronization between the program instructions of the functional processing units is provided by inserting one or more wait-go instruction pairs in the instruction streams. As shown in FIG. 2A, communication in the direction from APU 12 to LD 18 is through an APU-LD counter 36. Communication in the direction from LD 18 to APU 12 is through an LD-APU counter 38. One or more wait-go instruction pairs 40, 42 are inserted in program instruction buffers 16 and 18, respectively and one or more wait-go instruction pairs 44, 46 are inserted in program instruction buffers 22 and 16, respectively. In this embodiment, the first program instruction stream includes at least one a 'wait' instruction and matching 'go' instruction is included in the second instruction stream. As shown in one exemplary embodiment in FIG. 2B, instruction stream 48 is for APU 12 and instruction stream 50 is for LD 18. Instructions 3, 5, 7 of stream 50 depend on instructions 2, 4, and 6 of stream 48. Initially, counters 14, 20, 36 and 38 are set to zero. Wait instructions 44a, 44b, 44c are inserted before instructions 3, 5, 7 of stream 50. Go instructions 46a, 46b, 46c are inserted after instructions 2, 4, 6 of stream 48. If the go instruction 46a of wait-go pair 44a-46a reaches first, the APU-LD counter 36 is incremented. If the wait instruction 44a of the wait-go pair 44a-46a reaches first, LD 18 checks the APU-LD counter 36 and if zero, the LD 18 stream 50 waits until the APU-LD counter 36 is incremented by APU 12. If the APU-LD counter 36 is incremented when checked, the APU-LD counter 36 is decremented and stream 50 proceeds.

In one embodiment synchronization between the program instructions of the functional processing units is provided by inserting one or more wait-go bits to the instruction streams. In this embodiment, each instruction comes with attributes, such as additional bit fields, that indicate 'wait' or 'go'. Instructions in the first program instruction stream may have 'wait' attributes and instructions in the second program instruction stream have matching 'go' attributes. Instructions 3, 5, 7 in LD 18 stream 62 depend on instructions 2, 4, 6 of APU 12 stream 60. Initially, all counters are set to zero. Go bits 56 a, 56b, 56c are injected into instructions 2, 4, 6 of stream 60. Wait bits 58a, 58b, 58c are injected into stream 62. If instruction 2 with injected go bit 56a reaches, APU-LD counter 36 is incremented and stream 60 proceeds to instruction 3. If instruction 3 with injected wait bit 58a reaches, LD 18 unit checks APU-LD counter 36. If the counter 36 is zero, LD unit 18 waits until APU 12 increments counter 36. If counter 36 is incremented, APU 12 decrements counter 36 and stream 62 proceeds.

This invention achieves parallel usage of multiple functional units while being more flexible than VLIW arch in that functional units are not in lockstep. The invention is also more flexible than Modern arch in that each FU is independent by having its own program counter, is more lightweight mechanism than DAE arch and Modern arch. Unlike DAE arch, register file can be shared among FUs and unlike Modern arch, complex register renaming is not needed.

If the dependency between the first program instruction stream and the second program instruction streams cannot be determined at compiler time, a plurality of counters for each direction, that is APU-LD and LD-APU, can be used. In such case, the wait-go pair have bit vector specifying counters.

Figure 4:
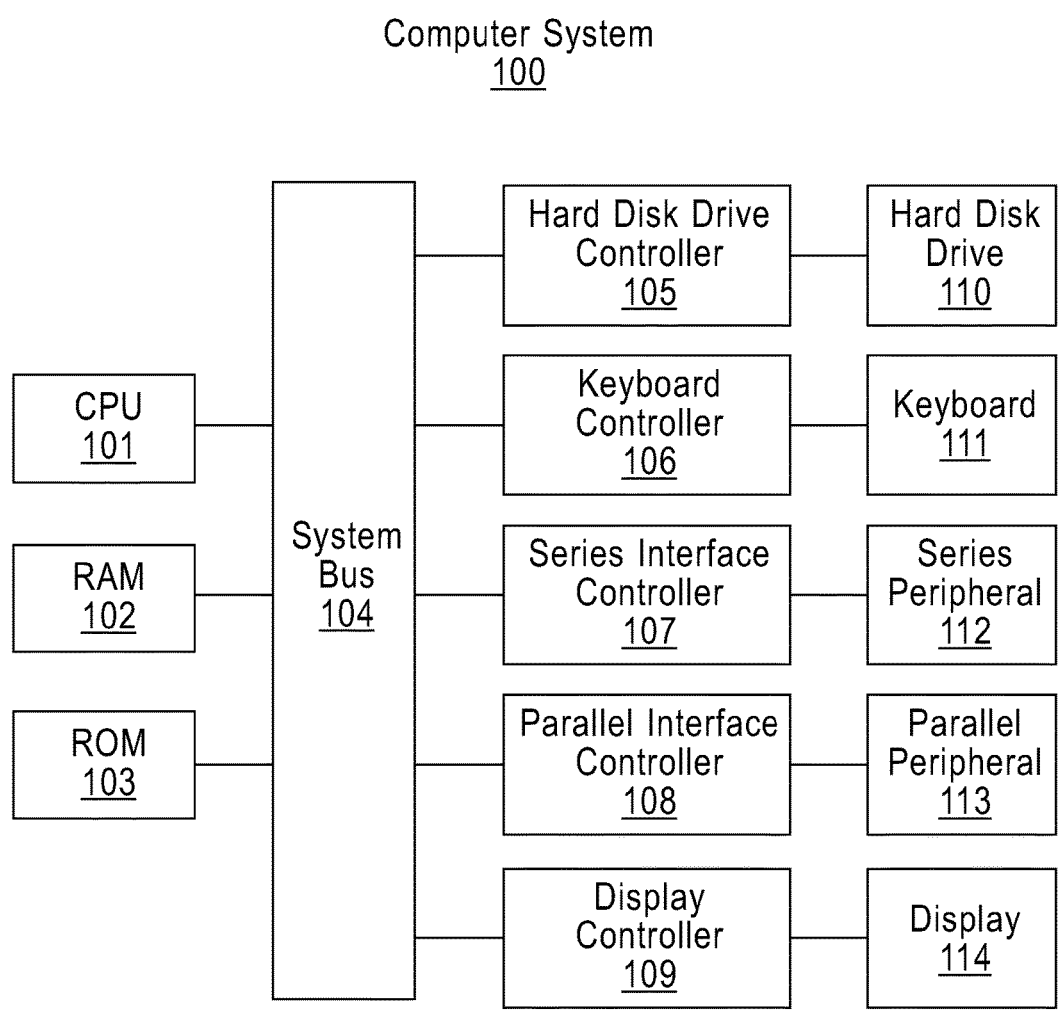
FIG. 4 is a block diagram of an exemplary computing system suitable for implementation of this invention.

FIG. 4 shows an exemplary computer system 100, which is applicable to implement embodiments of the present invention. As shown in FIG. 4, computer system 100 can include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among the above devices, CPU 101, RAM 102, ROM 103, Hard Drive Controller 105, Keyboard Controller 106, Serial Interface Controller 107, Parallel Interface Controller 108 and Display Controller 109 are coupled to System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. Display 114 is coupled to Display Controller 109. It should be understood that the structure as shown in FIG. 4 is only for exemplary purposes rather than any limitation to the present invention. In some cases, some devices can be added to or removed from computer system 100 based on specific situations.

As will be appreciated by one skilled in the art, aspects of the present invention can be embodied as a system, method, or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module," or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the above. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the above. In the context of this invention, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including, but not limited to, wireless, wire line, optical fiber cable, RF, etc., or any suitable combination of the foregoing.

Computer program code for carrying out operations for aspects of the present invention can be written in any combination of one or more programming languages, including an object oriented programming language, such as Java, Smalltalk, C++, and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatuses (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture, including instruction means which implement the function/act specified in the flowchart and/or block diagram block or blocks. The computer program instructions can also be loaded onto a computer, other programmable data processing apparatus, or other devices to cause a series of operational steps to be performed on the computer, other programmable apparatus or other devices to produce a computer implemented method such that the instructions which execute on the computer or other programmable apparatus provide processes for implementing the functions/acts specified in the flowchart and/or block diagram block or blocks.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A system for synchronizing parallel processing of a plurality of functional processing units, comprising:
   a first functional processing unit,
   a first program instruction buffer used by the first functional processing unit,
   a first program counter being configured to control timing of a first stream of program instructions issued to the first functional processing unit by advancement of the first program counter, the first program counter being configured to point to a current instruction in the first program instruction buffer which is read and issued by the first functional processing unit;

a second functional processing unit, a second program instruction buffer used by the second functional processing unit; and a second program counter being configured to control timing of a second stream of program instructions issued to the second functional processing unit by advancement of the second program counter; the second program counter being configured to point to a current instruction in the second program instruction buffer which is read and issued by the second functional processing unit, wherein the first functional processing unit being in communication with the second functional processing unit and configured to synchronize the issuance of the first stream of program instructions to the second stream of program instructions and the second functional processing unit being in communication with the first functional processing unit and configured to synchronize the issuance of the second stream program instructions to the first stream of program instructions, and wherein the second functional processing unit is configured to set a limit on advancement of the second program counter.

2. The system according to claim 1, wherein the first functional processing unit is configured to set a limit on advancement of the first program counter.

3. The system according to claim 1, wherein at least one of the first and second program instruction buffers include set limit instructions inserted in the respective first and second program instruction streams.

4. The system according to claim 1, wherein the first and second program instruction buffers include at least one pair of wait-go instructions in which one instruction of the wait-go pair is inserted in the first program instruction stream and the other instruction of the wait-go pair is inserted in the second program instruction stream.

5. The system according to claim 1, further including a third counter connected between the first and second functional processing units configured to mediate communication from the first functional processing unit to the second functional processing unit to synchronize the issuance of the first stream of program instructions to the second stream of program instructions and a fourth counter connected between the first and second functional processing units configured to mediate communication from the second functional processing unit to the first functional processing unit to synchronize the issuance of the second stream of program instructions to the first stream of program instructions.

6. A system for synchronizing parallel processing of a plurality of functional processing units, comprising:

a first functional processing unit, a first program instruction buffer used by the first functional processing unit, a first program counter being configured to control timing of a first stream of program instructions issued to the first functional processing unit by advancement of the first program counter, the first program counter being configured to point to a current instruction in the first program instruction buffer which is read and issued by the first functional processing unit;

a second functional processing unit, a second program instruction buffer used by the second functional processing unit; and a second program counter being configured to control timing of a second stream of program instructions issued to the second functional processing unit by advancement of the second program counter; the second program counter being configured to point to a current instruction in the second program instruction buffer which is read and issued by the second functional processing unit, wherein the first functional processing unit being in communication with the second functional processing unit and configured to synchronize the issuance of the first stream of program instructions to the second stream of program instructions and the second functional processing unit being in communication with the first functional processing unit and configured to synchronize the issuance of the second stream program instructions to the first stream of program instructions, and wherein the first and second program instruction buffers include at least one pair of instructions inserted with wait-go bits in which one instruction of the pair has one of the wait-go bits inserted in the first program instruction stream and the other instruction of the pair has the other of the wait-go bits is inserted in the second program instruction stream.

7. The system according to claim 6, wherein the first functional processing unit is configured to set a limit on advancement of the first program counter.

8. The system according to claim 6, wherein at least one of the first and second program instruction buffers include set limit instructions inserted in the respective first and second program instruction streams.

9. The system according to claim 6, wherein the first and second program instruction buffers include at least one pair of wait-go instructions in which one instruction of the wait-go pair is inserted in the first program instruction stream and the other instruction of the wait-go pair is inserted in the second program instruction stream.

10. The system according to claim 6, further including a third counter connected between the first and second functional processing units configured to mediate communication from the first functional processing unit to the second functional processing unit to synchronize the issuance of the first stream of program instructions to the second stream of program instructions and a fourth counter connected between the first and second functional processing units configured to mediate communication from the second functional processing unit to the first functional processing unit to synchronize the issuance of the second stream of program instructions to the first stream of program instructions.

11. A non-transitory article of manufacture tangibly embodying computer readable instructions, which when implemented, cause a computer to perform the steps of a method for synchronizing parallel processing system comprising a first functional processing unit, a first program instruction buffer used by the first functional processing unit, a first program counter being configured to control timing of a first stream of program instructions issued to the first functional processing unit by advancement of the first program counter, the first program counter being configured to point to a current instruction in the first program instruction buffer which is read and issued by the first functional processing unit; a second functional processing unit, a second program instruction buffer used by the second functional processing unit; and a second program counter being configured to control timing of a second stream of program instructions issued to the second functional processing unit by advancement of the second program counter; the second program counter being configured to point to a current instruction in the second program instruction buffer which is read and issued by the second functional processing unit, the method comprising:

synchronizing at least one of the issuance of the first stream of program instructions to the second stream of program instructions through communication from the first functional processing unit communication to the second functional processing unit to and the issuance of the second stream program instructions to the first stream of program instructions through communication from the second functional processing unit to the first functional processing unit, wherein the synchronizing includes setting a limit on advancement of the second program counter.

12. The non-transitory article of manufacture according to claim 11, wherein the synchronizing includes setting a limit on advancement of the first program counter.

13. The non-transitory article of manufacture according to claim 11, wherein the synchronizing includes inserting at least one pair of wait-go instructions in the first and second program instruction buffers by inserting one instruction of the wait-go pair in the first program instruction stream and inserting the other instruction of the wait-go pair in the second program instruction stream.

14. The non-transitory article of manufacture according to claim 11, wherein the synchronizing the issuance of the first stream of program instructions to the second stream of program instructions includes mediating communication from the first functional processing unit to the second functional processing unit through a third counter connected between the first and second functional processing units and wherein the synchronizing the issuance of the second stream of program instructions to the first stream of program instructions includes mediating communication from the second functional processing unit to the first functional processing unit through a fourth counter connected between the first and second functional processing units.

15. The non-transitory article of manufacture according to claim 11, wherein the synchronizing includes inserting at least one pair of instructions inserted with wait-go bits in which one instruction of the pair has one of the wait-go bits inserted in the first program instruction stream and the other instruction of the pair has the other of the wait-go bits is inserted in the second program instruction stream.

\* \* \* \* \*